LINEAR VOLTAGE VARIABLE RESISTANCE NETWORKS

Filed Aug. 1, 1966

INVENTOR.
JOHN G. NORDAHL
BY Arnold & Roylance
ATTORNEYS

INVENTOR.
JOHN G. NORDAHL
BY
Arnold & Roylance
ATTORNEYS

United States Patent Office 3,428,884
Patented Feb. 18, 1969

3,428,884
LINEAR VOLTAGE VARIABLE RESISTANCE NETWORKS

John G. Nordahl, Lexington, Mass., assignor to Weston Instruments, Inc., Newark, N.J., a corporation of Delaware Filed Aug. 1, 1966, Ser. No. 569,407
U.S. Cl. 323—19 8 Claims
Int. Cl. G05f *1/44, 1/56*

ABSTRACT OF THE DISCLOSURE

A voltage-controlled variable resistance circuit in which the magnitude of the controlled resistance is inversely proportional to the magnitude of the control voltage. The circuit has for each output terminal, two series circuits each including a plurality of diodes, the two diode circuits being connected in opposite polarity relationship with respect to the terminal. A control voltage is applied to a high gain operational amplifier having nonlinear feedback, the amplifier being used to compute the voltage drive required to cause a current proportional to the control voltage to flow through one of the diode series circuits. An inverting operational amplifier applies an opposite polarity voltage of the same magnitude to the other diode series circuit. Transient and other undesirable effects are thereby balanced out of the system.

This invention relates to variable resistance networks, and more particularly to such networks for presenting a terminal resistance which varies in accordance with a control voltage.

It is well known that the relatively linear portion of the current-voltage curve of a diode can be employed to produce a desired controlled variable resistance or, in other applications with ancillary equipment, to produce a curve representing a desired function. Function generators using this general concept are discussed in the Electronic Analog Computers, Korn and Korn, 2nd Edition, 1956, McGraw-Hill Book Co., Inc., New York, beginning at page 290, and need not be discussed in detail herein.

Circuits to provide a controllably variable resistance have been proposed in the past and have achieved considerable success. However, such circuits have suffered from numerous disadvantages, including nonlinearity of resistance as a function of control voltage, variations of resistance with temperature, undesirable voltage transients and distortion.

In the relatively simple circuits of the prior art hereinafter discussed, the terminal resistance does not always follow the desired proportionality to applied control voltage, especially at low values of voltage, because the voltage drop across the diodes used in the circuit becomes significant and prevents sufficient control current from flowing. Further, an undesirable transient effect occurs when the control voltage changes rapidly, causing a shift in the diode voltage drop. The voltage change is coupled through the output capacitor, producing a false signal at the output terminal which may be larger than the desired signal.

One object of the present invention is to provide a voltage variable resistance network in which the controlled resistance is linearly inversely proportional to a control voltage.

Another object is to provide a linear variable resistance network which is substantially unaffected by temperature.

Yet another object is to provide a linear variable resistance network in which the undesirable effects of transients and distortion are minimzed.

The apparatus of the present invention includes, for each output terminal, two series circuits each including a plurality of diodes, and two diode circuits being connected in opposite polarity relationship with respect to the terminal. A control voltage is applied to a high gain operational amplifier having nonlinear feedback, the amplifier being used to compute the voltage drive required to cause a current proportional to the control voltage to flow through one of the diode series circuits. An inverting operational amplifier applies an opposite polarity voltage of the same magnitude to the other diode series circuit. Transient and other undesirable effects are thereby balanced out of the system.

A plurality of pairs of diode circuits can be connected to the above drive circuit to feed a plurality of resistance terminals, although, of course, all such terminals will exhibit the same resistance variations characteristics at whatever levels are selected.

In order that the manner in which the foregoing and other objects are attained in accordance with the invention can be understood in detail, particularly advantageous embodiments thereof will be described with reference to the accompanying drawings, which form a part of this specification, and wherein.

Figure 1:
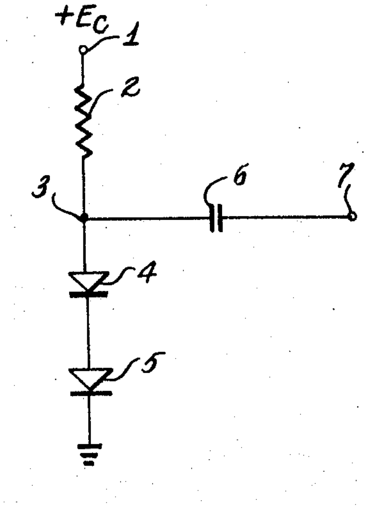
FIG. 1 PRIOR ART
FIG. 1 is a schematic diagram showing one typical prior art variable resistance network.

FIG. 1 shows a relatively simple circuit including an input terminal 1 to which a positive control voltage $E_c$ can be applied. One end of a resistor 2 is connected to terminal 1 and the other end of resistor 2 is connected to a junction 3. The anode end of a series connection of two diodes 4 and 5, both poled in the same direction, is connected to junction 3, the cathode end of this series circuit being connected to ground. One plate of a blocking capacitor 6 is also connected to junction 3, the other plate of capacitor 6 being connected to an output terminal 7.

Resistor 2 is chosen so that the control voltage applied to terminal 1 will cause the diodes to operate along the substantially linear portion of their characteristic curves to provide between terminal 7 and ground a resistance value which is proportional to the inverse of the control voltage, $E_c$. However, this proportional relationship holds true only for values of $E_c$ which are substantially greater than the normal voltage drops across the diodes. Clearly, to establish the terminal resistance level at a high value, more diodes can be inserted in the series circuit. However, because of the nonlinear characteristics of the diodes, the higher terminal resistance value is attained only at a sacrifice of resistance linearity. Other difficulties are likewise encountered, as enumerated above.

Figure 2:
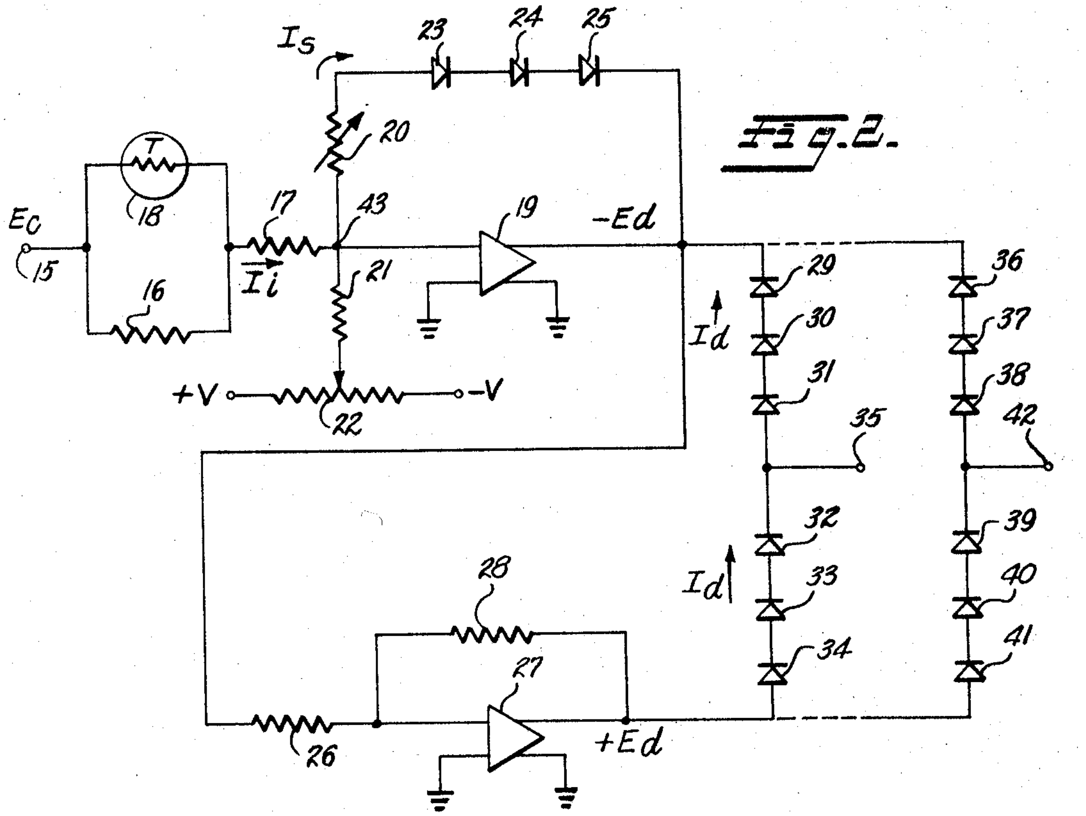
FIG. 2 is a schematic diagram partly in block form illustrating one embodiment of the invention.
Figure 3:
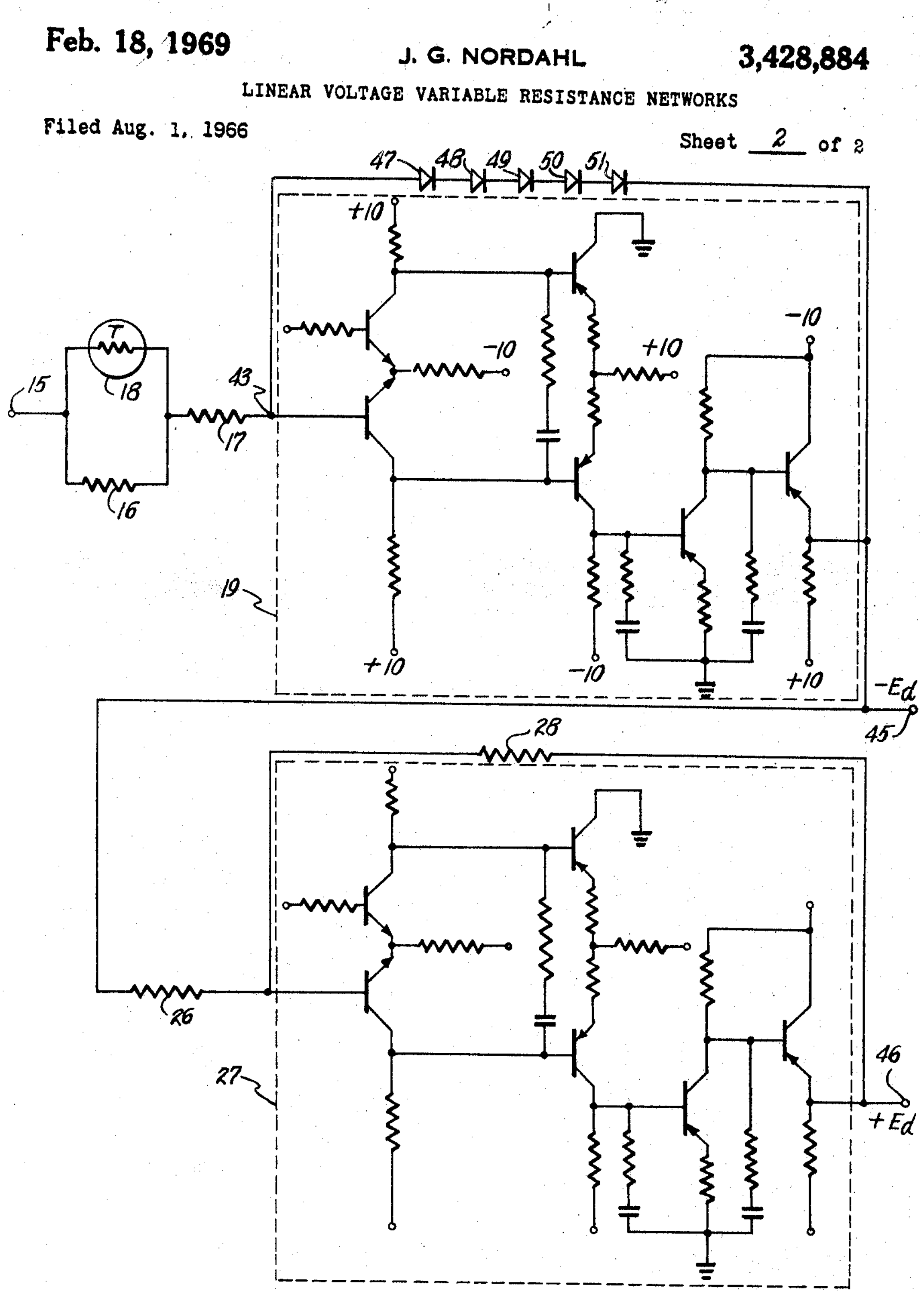
FIG. 3 is a schematic diagram of another embodiment of the invention.

As will be obvious to one skilled in the art, the polarities of the input voltage, $E_c$, and of all of the series diodes may be reversed with substantially identical results in this circuit and in the circuits of FIGS. 2 and 3, except that all DC potentials will be inverted.

A circuit which overcomes these disadvantages is shown in FIG. 2 wherein the control voltage $E_c$ is applied to a terminal 15. An input resistance network includes a resistor 16, a resistor 17, and a temperature sensitive resistor such as a thermistor 18. Resistor 16 and thermistor 18 are connected in parallel circuit relationship, one end of this parallel circuit being connected to terminal 15 and the other end being connected to one terminal of resistor 17. The other end of resistor 17 is connected to the input terminal of a high gain operational amplifier 19, and also to one terminal of a variable resistor 20 and to one terminal of a fixed resistor 21. The other terminal of resistor 21 is connected to the movable contact or wiper of a variable resistor 22, the ends of which are connected to a positive and a negative source of DC voltage, respectively.

The other terminal of resistor 20 is connected to the anode of a diode 23. Diode 23 is connected in series circuit relationship with a diode 24 and a diode 25, the three diodes being poled in the same direction, and the cathode of diode 25 being connected to the output terminal of amplifier 19.

The output terminal of amplifier 19 is also connected to one terminal of a resistor 26, the other terminal of which is connected to the input terminal of a high gain operational amplifier 27. A fixed value feedback resistor 28 is connected between the input and output terminals of amplifier 27.

A plurality of semiconductor diodes 29–34 are connected in series circuit relationship between the output terminal of amplifier 19 and the output terminal of amplifier 27, all of the diodes in this series circuit being poled in the same direction with the cathodes toward amplifier 19 and the anodes toward amplifier 27. A network output terminal 35 is connected to the series diode circuit at its midpoint so that an equal number of diodes exist between terminal 35 and amplifier 19 and between terminal 35 and amplifier 27. It will be apparent that, with respect to terminal 35, half of the diodes are poled in one direction and half in the other.

As will be discussed below, other circuits may be added to the circuit thus far described by connecting a second series of diodes, shown in FIG. 2 as diodes 36–41, with an output terminal 42 being connected to the midpoint of this latter series circuit. Also, other circuits, not shown, similar to the circuit including diodes 36–41, can optionally be added to the network shown.

The operation of the circuits shown in FIG. 2 overcomes the above enumerated difficulties largely by employing two series diode circuits of opposite polarity relative to the output terminal, and by providing a balanced drive to the two portions of the diode circuit, or, as illustrated in the optional circuit connections, in the several diode circuits. The feedback circuit including diodes 23, 24 and 25 provides a nonlinear feedback impedance for amplifier 19 to allow that amplifier to develop an output voltage to drive a current which is proportional to the control voltage $E_c$ through any equal number of similar semiconductor diodes returned to essentially ground potential and, hence, supplies that current to one half of the series diode circuit connected to resistance output terminal 35. The development of that current is controlled by voltage $E_c$ applied to terminal 15 and, through the summing resistor network including resistors 16, 17 and 18, to summing junction 43 at the input terminal of amplifier 19. Application of the control voltage at terminal 15 causes a current of magnitude $I_i$ to flow in resistor 17. The operational amplifier responds to that current by providing a voltage $-E_d$ at the output terminal of amplifier 19, voltage $-E_d$ being of such magnitude that a current $I_s$ flows in the feedback circuit including diodes 23–25 and resistor 20. Due to the high feedback gain of amplifier 19, the voltage $-E_d$ will be such that $I_s$ is equal to the algebraic sum of all of the currents flowing into junction 43. The potential of junction 43 is virtually zero, and $I_s$ therefore is substantially equal to $I_i$ The voltage $-E_d$ is provided to the input terminal of amplifier 27, which is also a high gain operational amplifier, but which is provided with fixed feedback resistor 28. The value of resistor 28 is selected so that the overall gain of amplifier 27 is $-1$. Thus, at the output terminal of amplifier 27, a voltage $+E_d$ appears.

With equal but opposite voltages applied across the series circuit including diodes 29–34, it will be apparent that output terminal 35 remains at substantially DC ground potential, and that a current $I_d$ will flow in that series circuit.

Now it will be apparent that, if the number of diodes in the feedback circuit is chosen to be equal to the number of diodes in one-half of the series output circuit, i.e., between output terminal 35 and the output terminal of either amplifier, then the current $I_d$ is necessarily equal to $I_s$ and therefore is also equal to $I_i$. Further, it will be apparent that $I_d$ is proportional to the control voltage $E_c$, as is $I_i$.

It is well known that the incremental resistance of a single diode is inversely proportional to the current flowing through that diode. Thus, because $I_d$ is proportional to $E_c$, it will be clear that the resistance at terminal 35 is inversely proportional to $E_c$ and hence can be varied over a wide range by merely varying $E_c$.

It will further be apparent that because summing junction 43 rests at substantially zero potential, the diode drop does not affect the linearity of the control voltage-to-diode-current conversion as would be the case in the relatively simple circuit shown in FIG. 1. Current through the feedback diode becomes exactly equal to the control currents divided by the input resistance as the amplifier gain approaches infinity. Because the summing junction is virtually at ground potential, the output voltage of amplifier 19 is exactly equal to the drive voltage necessary to produce a current equal to the control voltage provided by the input resistance through a series circuit including the preselected number of diodes.

It is most advantageous, in establishing the initial circuit to perform the above described functions, to select the diodes in the feedback circuit to have quite similar characteristics, and as previously mentioned, the number of diodes in that circuit should be equal to the number of diodes between the output terminal 35 and either of the amplifier output terminals. As a practical matter, it is not feasible to select diodes for the feedback circuit which will have precisely the same characteristics. For optimum linearity, a small resistor 20 is inserted in series circuit relationship with the feedback diodes to adjust the linearity of those diodes at relatively high voltage levels. Also, fixed resistor 21 and variable resistance 22 are connected between a source of DC voltage and the amplifier input terminal to establish the initial level at which the amplifier operates and thus to improve linearity of the system at low input voltage levels.

The problems associated with rapidly changing control voltages are automatically compensated for in the circuit of FIG. 2 by the incorporation of the two sets of inversely related diodes relative to output terminal 35. It will be recalled that, in the circuit of FIG. 1, large input voltage changes tended to store a charge on capacitor 6 which had no discharge path, this charge being capable of overwhelming the desired control signal to later equipment connected to terminal 7. It was necessary to include that blocking capacitor, however, to prevent the DC variations from reaching the output terminal and to allow AC to pass. In the circuit of FIG. 2, however, this disadvantage is avoided because terminal 35 is maintained at substantially ground level for DC, the only variation observable at that terminal being the change in AC resistance induced by the control voltage.

Likewise, temperature compensation is automatically attained because changes in diode voltage drops with temperature are the same in the diode series circuit including diodes 29–34 and the feedback circuit including diodes 23–25. Changes in incremental diode resistance with absolute temperature are compensated for by incorporating a temperature sensitive resistor, shown as thermistor 18, in the input resistance circuit. Thus, as temperature increases, the effective resistance of the input circuit to summing junction 43 decreases, allowing an increase in input current and thus an increase in current $I_d$ through diodes 29–34.

FIG. 3 shows a schematic diagram of a practical circuit to accomplish the functions described with reference to FIG. 2. In FIG. 3, those elements which remain the same as in FIG. 2 are similarly numbered, these including control voltage input terminal 15, thermistor 18, resistor 16, resistor 17, and summing junction 43 in the input circuit. The linearity adjustment resistors associated with the input and feedback circuits have been omitted. Amplifier circuit 19 is shown within dotted lines. The series diode circuits equivalent to those including diodes 29–34 and 36–41 and output terminals 35 and 42 are not shown in FIG. 3. These would be connected between terminals 45 and 46.

It will be observed that in FIG. 3 the nonlinear feedback circuit associated with amplifier 19 includes diodes 47–51, five diodes rather than the three diodes shown in the feedback circuit of FIG. 2. It will be recognized that any convenient number of diodes can be used in this circuit to obtain the desired resistance level and resistance slope. However, for best operation, the number of diodes in the feedback circuit should equal the number of diodes in each half of the series diode circuit to which the network output resistance terminal is connected.

The transistor circuitry shown in FIG. 3 is relatively conventional operational amplifier circuitry and need not be described in further detail.

While advantageous embodiments have been chosen to illustrate the invention, it will be understood by those skilled in the art that various changes and modifications can be made therein without departing from the scope of the invention as defined in the appended claims.

What is claimed is:

1. An electrical network for providing a voltage-controlled variable resistance comprising the combination of
   an output terminal at which said variable resistance appears with respect to a point of reference potential;
   a plurality of asymmetrically conductive semiconductor devices connected in series circuit relationship to form a first series circuit, one end of said first series circuit being connected to said output terminal;
   a plurality of asymmetrically conductive semiconductor devices connected in series circuit relationship to form a second series circuit, one end of said second series circuit being connected to said output terminal;
   an input terminal to which a control voltage can be applied;
   first circuit means connected between said input terminal and the other end of said first series circuit for providing a first driving current to said first series circuit proportional to said control voltage; and
   second circuit means coupled to the other end of said second series circuit and to said first circuit means for supplying a driving current to said second series circuit substantially equal in magnitude to said first driving current and of opposite polarity;
   said semiconductor devices of said first and second series circuits being oppositely poled relative to said output terminal.

2. Apparatus for providing a voltage-controlled variable resistance comprising the combination of a first terminal to which a control voltage can be applied; first amplifier circuit means having an input terminal and an output terminal; resistance circuit means interconnecting said first terminal and said input terminal of said amplifier circuit means; feedback circuit means connected between said input and output terminals of said first amplifier circuit means for providing nonlinear feedback to said input terminal and a current proportional to said control voltage at said output terminal of said first amplifier circuit means; second amplifier circuit means having an input terminal and an output terminal for providing a signal at said output terminal inverted in form from a signal applied at said input terminal; circuit means interconnecting said output terminal of said first amplifier circuit means and said input terminal of said second amplifier circuit means; a plurality of asymmetrically conductive semiconductor devices connected in series circuit relationship forming a first series circuit, one end of said series circuit being connected to said output terminal of said first amplifier circuit means; and the other end of said series circuit being connected to said output terminal of said second amplifier circuit means; and an output terminal at which the variable resistance exists relative to a point of reference potential, said output terminal being connected to a point in said series circuit at which equal numbers of diodes exist between said point and said ends.

3. Apparatus according to claim 2 wherein
   said feedback circuit means comprises a plurality of semiconductor diodes connected in series circuit relationship between said input terminal and said output terminal of said first amplifier circuit means.

4. Apparatus according to claim 3 wherein
   said asymmetrically conductive semiconductor devices in said series circuit are semiconductor diodes, and
   the number of said diodes in said series circuit is equal to twice the number of diodes in said feedback circuit means.

5. Apparatus according to claim 3 wherein
   said feedback circuit means further comprises a variable resistor connected in series circuit relationship with said diodes for adjusting the linearity of said feedback.

6. Apparatus according to claim 2 wherein
   said second amplifier circuit means comprises
   an operational amplifier having high gain, and
   resistor means connected between the input and output terminals of said operational amplifier to provide sufficient feedback to render the overall gain of said second amplifier circuit means equal to minus one.

7. Apparatus according to claim 2 and further comprising
   a plurality of semiconductor diodes connected in series circuit relationship forming a second series circuit,
   said second series circuit being connected in parallel circuit relationship with said first series circuit; and
   a second output terminal connected to a point midway between the ends of said second series circuit.

8. Apparatus according to claim 2 and further comprising
   a source of DC voltage; and
   variable resistance circuit means connected between said DC source and said input terminal of said first amplifier circuit means for adjusting the minimum control voltage level applied to said amplifier circuit means.

References Cited

UNITED STATES PATENTS

| | | | |
|---|---|---|---|
| 2,958,831 | 11/1960 | Clark | 330—151 X |
| 3,296,520 | 1/1967 | Griffith | 323—74 |

LEE T. HIX, *Primary Examiner.*

A. D. PELLINEN, *Assistant Examiner.*

U.S. Cl. X.R.

235—197; 307—229; 323—79; 328—142

Disclaimer and Dedication 3,428,884.—*John G. Nordahl*, Lexington, Mass. LINEAR VOLTAGE VARIABLE RESISTANCE NETWORKS. Patent dated Feb. 18, 1969. Disclaimer and dedication filed Mar. 17, 1971, by the assignee, *Weston Instruments, Inc.*

Hereby enters this disclaimer to the remaining term of said patent and dedicates said patent to the Public.

[*Official Gazette April 27, 1971.*]